US009646251B2

(12) United States Patent
Bhagwat et al.

(10) Patent No.: US 9,646,251 B2
(45) Date of Patent: *May 9, 2017

(54) DETECTION OF COMMUNICATION TOPIC CHANGE

(71) Applicant: International Business Machines Corporation, Armonk, NY (US)

(72) Inventors: Anand B. Bhagwat, Pune (IN); Amit P. Bohra, Pune (IN); Manojkumar Pal, Pune (IN); Abhishek Shrivastava, Pune (IN); Swapnasarit Sahu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,304

(22) Filed: Oct. 20, 2016

(65) Prior Publication Data
US 2017/0032261 A1 Feb. 2, 2017

Related U.S. Application Data

(63) Continuation of application No. 15/095,242, filed on Apr. 11, 2016, now Pat. No. 9,513,764, and a (Continued)

(51) Int. Cl.
*G06F 3/0481* (2013.01)
*G06N 5/04* (2006.01)
(Continued)

(52) U.S. Cl.
CPC ............. *G06N 5/04* (2013.01); *G06F 17/274* (2013.01); *G06F 17/2765* (2013.01); *G06N 99/005* (2013.01); *G10L 15/26* (2013.01)

(58) Field of Classification Search
None
See application file for complete search history.

(56) References Cited

U.S. PATENT DOCUMENTS 5,625,748 A     4/1997   McDonough et al.
5,982,365 A *  11/1999   Garcia .................. G06F 9/4446
                                                              707/999.102

(Continued)

OTHER PUBLICATIONS

Schmidt et al.; Detection of Topic Change in IRC Chat logs; 2008, Penn State University; pp. 1-10.*

(Continued)

*Primary Examiner* — Phenuel Salomon
(74) *Attorney, Agent, or Firm* — Daniel R. Simek

(57) ABSTRACT

A computer processor determines a first span of a communication, wherein a span includes content associated with one or more dialog statements. If the content of the first span contains one or more topic change indicators which are identified by at least one detector of a learning model, the computer processor, in response, generates scores for each of the one or more indicators. The computer processor aggregates scores of the one or more indicators of the first span, which may be weighted, to produce an aggregate score. The computer processor compares the aggregate score to a threshold value, wherein the threshold value is determined during training of the learning model, and the computer processor, in response to the aggregate score crossing the threshold value, determines a topic change has occurred within the first span.

1 Claim, 5 Drawing Sheets

Related U.S. Application Data continuation of application No. 14/277,290, filed on May 14, 2014.

(51) Int. Cl.
    *G06F 17/27*     (2006.01)
    *G10L 15/26*     (2006.01)
    *G06N 99/00*     (2010.01)

(56) References Cited

U.S. PATENT DOCUMENTS

| | | | |
|---|---|---|---|
| 6,104,989 A | | 8/2000 | Kanevsky et al. |
| 8,219,397 B2* | | 7/2012 | Jaiswal .............. G10L 15/063 704/231 |
| 8,229,753 B2* | | 7/2012 | Galanes ............ H04M 1/72561 704/270.1 |
| 8,577,671 B1* | | 11/2013 | Barve .............. G06F 17/30522 370/352 |
| 8,954,318 B2* | | 2/2015 | Barve .............. G06F 17/30522 370/352 |
| 9,223,901 B2* | | 12/2015 | Rabben ............ G06F 17/30967 |
| 9,286,619 B2* | | 3/2016 | Alonso .............. G06Q 30/0201 |
| 2006/0259473 A1* | | 11/2006 | Li ........................ G06Q 30/02 |
| 2007/0174407 A1* | | 7/2007 | Chen ...................... G06Q 10/10 709/207 |
| 2007/0226295 A1* | | 9/2007 | Haruna ............ G06F 17/30722 709/204 |
| 2009/0106375 A1* | | 4/2009 | Carmel ................. G06F 17/279 709/206 |
| 2009/0306979 A1* | | 12/2009 | Jaiswal ................ G10L 15/063 704/235 |
| 2010/0185437 A1* | | 7/2010 | Visel ..................... G06F 17/271 704/9 |
| 2012/0284093 A1 | | 11/2012 | Evans |
| 2014/0324982 A1 | | 10/2014 | Agrawal et al. |

OTHER PUBLICATIONS

DeLooze et al.; Automatic Detection and Prediction of Topic Changes Through Automatic Detection of Register Variations and Pause Duration; 2009; Interspeech; pp. 1-4.*

Esfandiari Baiat et al.; Topic Change Detection Based on Prosodic Cues in Unimodal Setting; Dec. 2012; IEEE; pp. 1-4.*

* cited by examiner

DETECTION OF COMMUNICATION TOPIC CHANGE

FIELD OF THE INVENTION

The present invention relates generally to the field of text analysis, and more particularly to detecting a topic change during a text communication.

BACKGROUND OF THE INVENTION

Communication between and among people is seldom limited to one subject or topic. Typically, communications may begin with greetings and polite exchanges, then progress to a specific topic in which there may be an exchange of dialog. In some instances, the communication will change topics and continue with additional dialog, and the topic change may repeat itself during the communication.

Determining when a change of topic occurs would be useful to provide information relevant to the topic of the communication that the participants might find useful. Relevant information may include factual content related to the topic, links to content providing information, links or email addresses to "experts", or even advertisements of providers of services or products related to the topic.

SUMMARY

Embodiments of the present invention disclose a method for determining a topic change of a digitized communication. A computer processor monitors a communication that includes a first span, and determines the communication to contain a set of dialog statements, in which the first span of the communication includes one or more dialog statements of the set of dialog statements. A computer processor determines if the one or more dialog statements of the first span include one or more indicators of a topic change, such that the one or more indicators are identified by at least one detector of a learning model, and each of the one or more indicators of the topic change within the first span includes at least one of: a particular key phrase, a pause of particular duration, a particular activity on a participant's communication device, and a particular duration of the first span. A computer processor, responsive to determining that the first span includes the one or more indicators of the topic change, generates a score for the one or more indicators, based on the learning model, and responsive to the score for the one or more indicators triggering a threshold condition, a computer processor determines a topic change within the first span, in which the threshold condition is based on a determination of the topic change within the first span of the communication during training of the learning model; and the threshold condition determined during training of the learning model includes: a weighted value for the at least one detector, based on heuristics, received input of labelled communication dialog statements in which the labelled communication dialog statements include one or more topic change indicators that are known, and the one or more topic change indicators that are known corresponding to the at least one detector. The threshold condition determined during training of the learning model also includes: a computer processor that adjusts the weighted value of the at least one detector in response to a delta between an output of scores of the at least one detector of the learning model and scores of the one or more topic change indicators that are known, and a computer processor that determines the threshold condition in response to achieving an acceptable minimum for the delta between the output of the scores which are determined by the at least one detector of the learning model and the scores of the one or more topic change indicators that are known. A computer processor generates a second span based on adjusting boundaries of the first span by performing at least one of, adding to the first span one or more dialog statements of the set of dialog statements not included in the first span, and removing one or more dialog statements from the first span. A computer processor determines a score for the first span and a score for the second span, such that the score for the first span and the score for the second span is based on a topic of the first span and a topic of the second span, respectively. Responsive to the score of the second span being more favorable than the score of the first span, a computer processor extracts one or more features from the one or more dialog statements of the second span not included in the first span, such that extraction of the one or more features from the one or more dialog statements of the second span, includes classifying the one or more features to correspond with the at least one detector of the learning model, and a computer processor trains the learning model to determine a topic change, based, at least in part, on including the one or more features from the one or more dialog statements of the second span, in at least one detector of the learning model.

DETAILED DESCRIPTION

Embodiments of the present invention recognize that digital communications, such as online chats, include dialog exchanges between two or more participants, and the communications may include multiple topics throughout the duration of the communication. Identifying the point at which a communication changes topic may be useful, so that information associated with the new topic can be made available to the chat participants. Topic changes may be obvious in some cases, whereas in other cases the topic changes may be subtle or even gradual and more difficult to determine.

Embodiments of the present invention disclose a method for determining a change of topic within communications using a learning model that is continually improved. Embodiments of the present invention may be applied to online chats, text message exchanges using short message services (SMS), email, or other social media using communication content. Embodiments may further extend to digitized voice conversations that include speech-to-text conversion. Multiple topic change detectors are used in combination as components of a topic change learning model used to determine a change of topic within a digitized conversation.

Embodiments of the present invention include detectors that determine if a topic change indicator is contained within a portion of a communication. The detectors may include, but are not limited to, a key word detector, a time measurement detector, a user personalized history detector, a user activity detector, and a text tiling detector. The various detectors are each used to score topic change indicators found in communication content, which contributes to an aggregate score, and when compared to a threshold, determines if a topic change has occurred in the communication. A learning model is used to generate the aggregate score and each span of communication including a topic change is further analyzed to determine stronger indicators of a topic change. The features associated with determining a stronger indication of topic change are mapped to specific detectors and included in the learning model for subsequent communication topic change detection, thus continually improving the model and adapting to changes in vocabulary, slang expressions, and dialog behavior.

Figure 1:
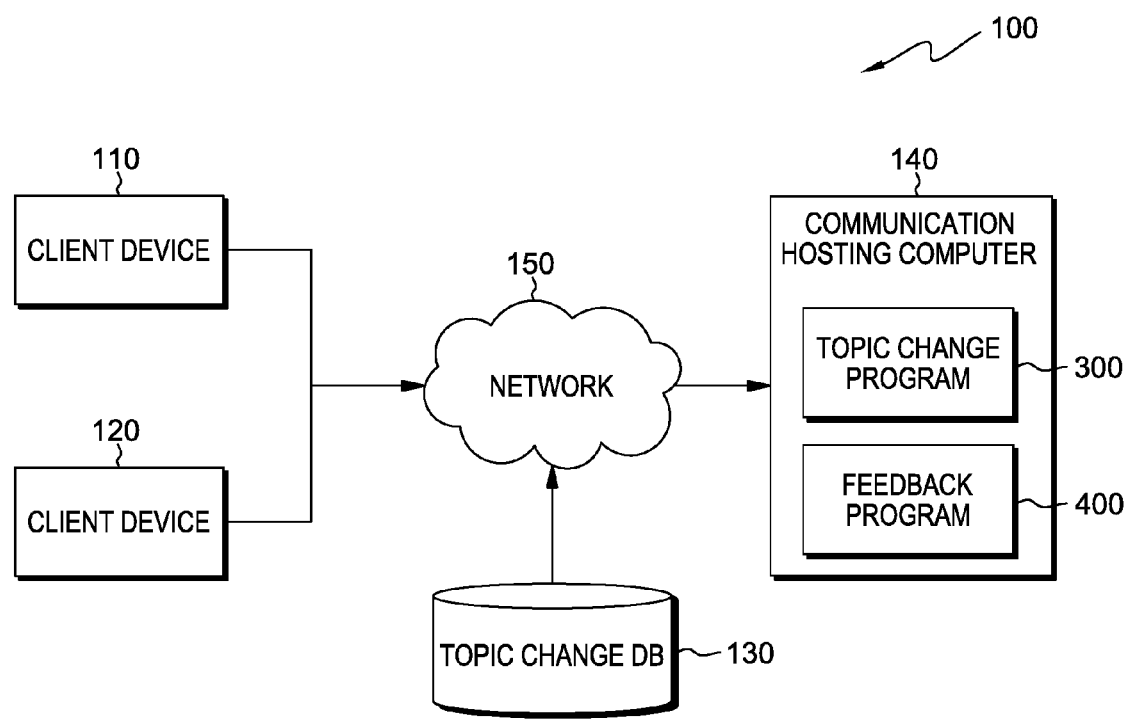
FIG. 1 is a functional block diagram illustrating a distributed communication processing environment, in accordance with an embodiment of the present invention.

The present invention will now be described in detail with reference to the Figures. FIG. 1 is a functional block diagram illustrating a distributed communication processing environment 100, in accordance with an embodiment of the present invention. FIG. 1 includes client devices 110 and 120, topic change database (DB) 130, communication hosting computer 140, depicted as including topic change program 300 and feedback program 400, and network 150.

Network 150 can be, for example, a local area network (LAN), a wide area network (WAN), such as the Internet, or a combination of the two, and can include wired or wireless connections. Network 150 can be a communication fabric within or between computer processors, such as a PCIe bus. Network 150 interconnects client devices 110, 120, topic change DB 130, and communication hosting computer 140. In one embodiment of the present invention, network 150 includes network connections and protocols supporting online chat sessions over the Internet between users of client devices, such as client devices 110 and 120. In another embodiment, network 150 includes network connections and protocols supporting short messaging service (SMS) exchanges, email exchanges, voice conversations using client devices, such as smart phones, or other social media exchanges involving digitized text or voice exchanges. In general, network 150 can be any combination of connections and protocols that will support communications, via various channels, between client devices 110 and 120, topic change DB 130, and communication hosting computer 140, within distributed communications environment 100, in accordance with an embodiment of the present invention.

Client devices 110 and 120 are computing devices capable of enabling participation in communication exchanges with other user devices, for example, online chats, emails, SMS exchanges, digitized voice conversations, and other social media which includes exchange of digitized voice or text content between two or more client devices. Client devices 110 and 120 can be a laptop computer, tablet computer, netbook computer, personal computer (PC), a desktop computer, a virtual instance of a mainframe computer, a personal digital assistant (PDA), a smart phone, or any programmable electronic device capable of exchanging communication content with one or more other computing devices.

In one embodiment of the present invention, client devices 110 and 120 are capable of operating topic change program 300, independent of communication hosting computer 140, and are capable of receiving data from and sending data to, topic change database 130 via network 150. Client devices 110 and 120 include internal and external hardware components, as depicted and described in further detail with respect to FIG. 5.

Topic change DB 130 provides storage and access for historic communication content, personalized history of one or more participants of a communication, external source data associated with a communication, and specific features and attributes of the detectors used by topic change program 300, and used to continually train the model used by topic change program 300. In response to communication content having been analyzed by detectors of the topic change model and a topic change occurrence determined, the historic communication content is sent to topic change DB 130 by topic change program 300. The historic communication content is used in a feedback analysis, performed by feedback program 400, to improve the topic change model.

Personalized history of one or more users may be included in topic change DB 130. One of the detectors used by the topic change model includes use of phrases, expressions, slang, vocabulary, pause time between dialogs, duration of communications, historic subject matter of communications, and activities performed on the user's client device associated with a topic change. Personalized history data for participants of communication hosting services may be stored in topic change DB 130, which in one embodiment of the present invention, may be a centralized storage device, accessible by communication hosting computer 140 via network 150, as illustrated in FIG. 1. In another embodiment, personalized history data of a participant may be stored in topic change DB 130 included in a participant's client device, for example client device 110.

External source data includes client device information of a user's activity on the client device that may be associated with the occurrence of a topic change within a communication. For example, a user may have a history of searching a web page on a browser during a communication dialog just prior to detection of a topic change. Data associated with the communication, including the attributes and features associated with topic changes as determined by each of the detectors of the learning model used by topic change program 300, are mapped to corresponding detectors and stored for analysis and comparison during communication span analysis.

Communication hosting computer 140 is a computing device enabling and supporting communication between two or more participants using client devices, such as client devices 110 and 120. In one embodiment of the present invention, communication hosting computer 140 may be an online chat server, to which chat participants connect to over the Internet, via network 150. In another embodiment, communication hosting computer 140 may provide an email service to users, or in yet another embodiment, communication hosting computer 140 may provide a voice communication service, for example, providing a voice-over-Internet protocol service (VoIP). Communication hosting computer 140 is depicted as including topic change program 300. In one embodiment of the present invention, topic change program 300 resides and operates on communication hosting computer 140. In other embodiments, topic change program 300 resides and operates on a client device, such as client device 110. In yet other embodiments, topic change program 300 does not reside on communication hosting computer 140 but is accessible by communication hosting computer 140 via network 150.

Communication hosting computer 140 is a server computing device that can be a desktop computer, a laptop computer, a specialized computer server, a client computer, a tablet, or a netbook personal computer (PC), a personal digital assistant (PDA), a smart phone, a mainframe computer, a web server computer, or a networked server computer. Further, communication hosting computer 140 can represent computing systems utilizing clustered computers and components to act as single pools of seamless resources when accessed through network 150, as is common in data centers and with cloud computing applications. In general, communication hosting computer 140 is representative of any programmable electronic device or combination of programmable electronic devices capable of executing machine-readable program instructions and capable of operating topic change program 300 and feedback program 400. Communication hosting computer 140 may include internal and external hardware components, as depicted and described in further detail with respect to FIG. 5.

Topic change program 300 uses a trained learning model, including multiple detectors, to monitor communications of text, or alternatively may monitor voice communications transformed to text, to determine when a topic change has occurred. Topic change program 300 makes use of multiple detectors, each of which is used in analysis of communication dialog, to determine if a topic change has occurred. The multiple detectors may include, but are not limited to, a key word based detector, a time based detector, a personalized history based detector, a user activity detector, and a text tiling based detector. A section of the communication content that may include one or more dialog statements, referred to as a "span", is analyzed by the detectors, and each detector generates a score for the span. The scores from each detector are aggregated to obtain an overall aggregate score associated with the span. The aggregate score is compared to a threshold value, determined during training of the learning model of topic change program 300, and if the aggregate score violates the threshold limit, a topic change is determined. In response to determining a topic change within the communication span, the entire communication content is fed to storage, such as saving the communication content to topic change DB 130. The stored communication content is accessed by topic change program 300, running in a background mode, to perform feedback analysis, which is used to improve the model and adapt the model to new conditions or behaviors.

Feedback program 400 operates in a background mode, and analyzes the content of stored communications, extracting features of the communication content that improves the accuracy and effectiveness of the model used by topic change program 300, over time. Feedback program 400 analyzes each topic change communication span, and creates "extra spans", also referred to herein as "new spans", by adding the content of one or more additional dialog statements from the communication, and removing the content of one or more dialog statements of the original span, in the manner of a "moving window". Feedback program 400 scores the original span and each new span based on the determined topic of the respective span, using heuristic methods. New spans scoring higher than the original span have features of the delta dialog statements extracted, classified, and mapped to one of the detectors. By including the extracted features from the higher scoring new span to the respective detectors allows topic change program 300 to improve topic change detection, over time.

The learning model used by topic change program 300 is trained by initially assigning coefficient values, or weighted values, to each of the detectors used to identify indicators of a topic change, typically by use of a heuristic. Content of various communications are input to the learning model, with the content being labelled, such that known indicators of topic changes are included within the content. Communication dialog content may include various single instances and combinations of keywords and phrases, as well as various pauses and time durations associated with the dialog. Additionally, the labelled content may include annotated behavior history representing a participant's behavior during communications, various activity by a participant on their client device while engaged in a communication, and text tiling information. Labelled content includes "answers" of topic change indicators to determine weights for detector scoring.

Variations of the input data are processed iteratively by the model, and the weighted values are adjusted to optimize the aggregate score based on the known topic change indicators. When an optimization is reached after multiple iterations of the model with labelled data, a threshold value is determined. The threshold value may continue to be adjusted, based on input from feedback program 400 and iterative operation of the model with additional features added to the detectors. After completing initial iterations and achieving a level of model stability, an independent second set of communication content may be applied and iterated until weighted values and the threshold are stable and consistent with labelled content data. By use of a learning model, topic change program 300 is able to learn and adapt to the use of new vocabulary, phrases, and behaviors.

Figure 2:
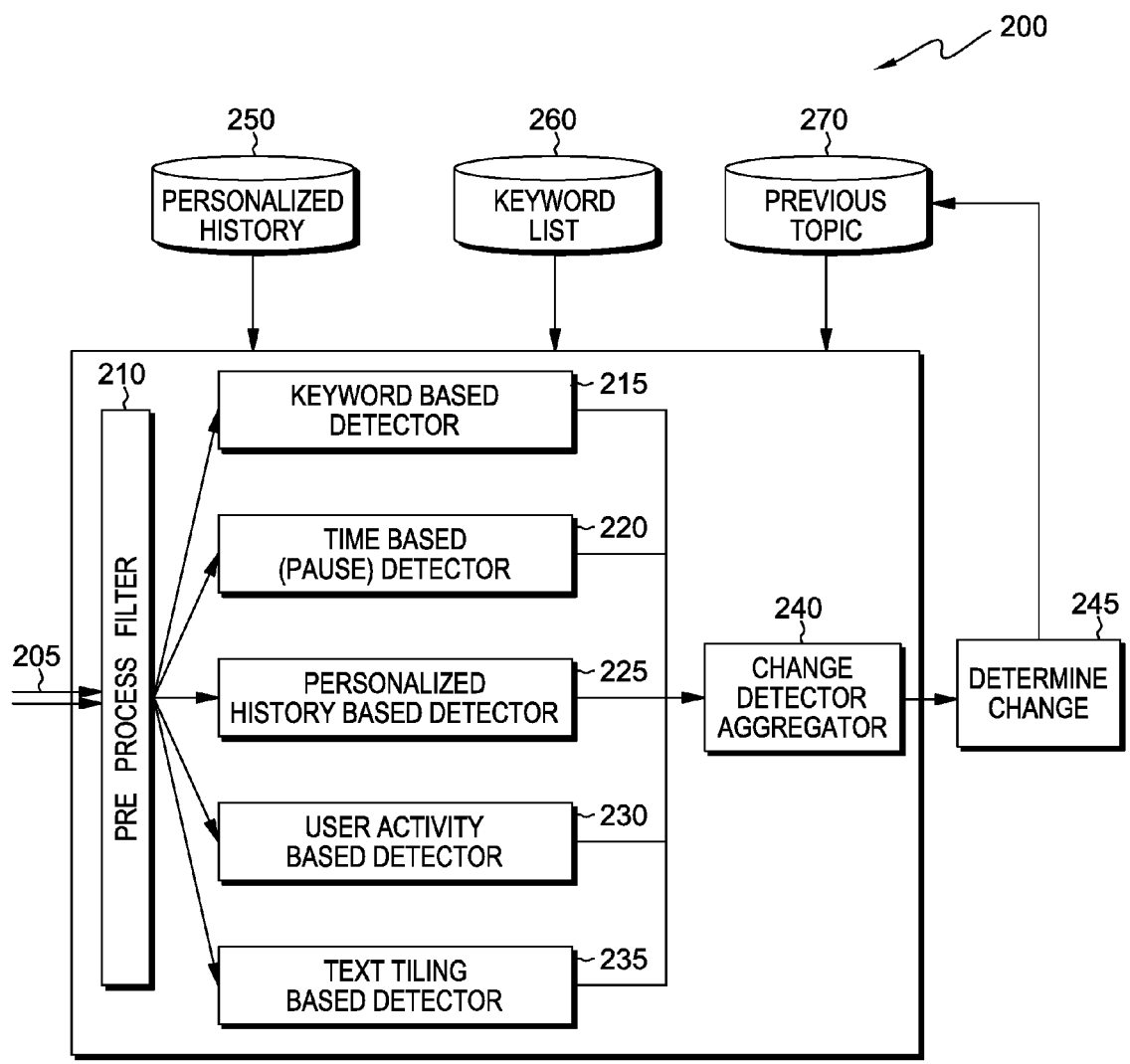
FIG. 2 is a functional block diagram depicting topic change detectors included in a topic change learning model of the communication processing environment of FIG. 1, in accordance with an embodiment of the present invention.

FIG. 2 is a functional block diagram depicting topic change detectors included in a topic change learning model of the communication processing environment of FIG. 1, in accordance with an embodiment of the present invention. FIG. 2 includes content input 205, pre-process filter 210, key word based detector 215, time based detector 220, personalized history based detector 225, user activity based detector 230, text tiling based detector 235, change detector aggregator 240, determine change 245, personalized history store 250, keyword store 260, and previous topic store 270.

Content input 205 represents the content of a communication span received by and processed through the learning model of topic change program 300. The span content includes the text from participant direct input, or text transformed from participant voice input, hereafter collectively referred to as "text input" or "text". The received span content also includes input used for time measurements, such as pauses between dialog statements and the duration of communication. Content input 205 also includes external elements, such as client device activity information that occurs during the communication of a participant, and data from personalized history of participants.

Pre-process filter 210 receives content input 205 and filters out unneeded or common text terms from the communication span content. In one embodiment pre-process filter 210 works with manually identified words, for example, "the, a, an, for, of," etc. . . . , and identifying the words in the communication span content, removes them from further processing by topic change program 300. In another embodiment, after initial heuristic setup, pre-process filter 210 is updated from words in the communication span content received by feedback analysis, which are repeatedly excluded from being mapped to detectors, thus improving filtering of content input 205 over time.

Keyword based detector 215 determines a change of communication topic based on keywords detected in the dialog that are commonly used to lead into or introduce a topic change. Keyword based detector 215 includes multiple pre-determined words and phrases known to be used in this manner, and determines if there is a match between the words and/or phrases in the communication dialog to the pre-determined words and phrases. The multiple keywords and key phrases may be stored in a list or table, accessible by topic change program 300.

Keyword based detector 215 applies a score to matches of keywords and phrases, with certain words and phrases providing a stronger indication of a topic change and therefore receiving a higher score. For example, the phrase "by the way", may provide one of the strongest indications of a topic change to follow and may be very highly scored, whereas other words or phrases may be weaker, suggesting a topic change may be somewhat possible, and would be scored accordingly. The keywords and phrases are continually updated by use of the feedback analyzer component of topic change program 300, discussed in detail with respect to FIG. 3, which serves to add new keywords and phrases that may include slang or frequent expressions used by the participant preceding a topic change.

Time based detector 220 considers aspects of time in determining if a topic change has or is about to occur. Time based detector 220 includes measurement of pauses between dialog statements of participants, duration of a specific topic dialog, and duration of the communication, as potential indicators of a topic change in a communication. A communication span in which the dialog exchange between participants is relatively quick and constant, may be preparing for a topic change if there is one or more pauses between dialog exchanges that is significantly longer than the preceding exchanges. For example, dialog exchanges for the first 5 text entries of two participants may have been entered within eight seconds or less, followed by the next two exchanges being entered within a duration exceeding twenty seconds.

Similarly, a topic change may be anticipated after a current topic dialog exceeds a particular duration, with the topic change probability increasing as the communication duration extends. Time based detector 220 scores instances of time detections and may compound scores when multiple time-based detections are made.

Personalized history based detector 225 uses historic and profile information of a participant in determining whether a topic change may occur in a communication. Personalized history based detector 225 uses various data of historic communication participation in determining a possible topic change in a communication. The historic data may include frequency of engaging in communication, frequency of conversing with particular participants, history of topics of previous communications, duration of topics, and duration of communications. Personalized history based detector 225 may also include the number of topics the participant includes in a communication, the number of exchanges within a topic during a communication, and may determine correlations between communication topics and other participants. Personalized history based detector 225 provides a score for a communication span of a particular participant, which includes recognition of historic timing, duration, or behavior, previously associated with a topic change.

User activity based detector 230 receives information associated with current activity of the participant's client device and determines if the one or more activities indicates a possible topic change. For example, a participant of a chat communication, after multiple dialog exchanges, may have exhausted their interest in the current topic. The participant may begin or return to use other features of the client device used for the chat communication, and engage in other activity, such as opening a browser page. Similarly, the participant may initiate or return to an activity to retrieve information that may lead to the next topic of chat communication. User activity based detector 230 scores the activity detected during a communication span, and may use other input, such as time based detector information, to determine the magnitude of the score.

Text tiling based detector 235 examines larger amounts of text and creates categorical groupings based on topic as determined by noun, verb, and context analysis, and determines if a topic has changed between groupings of text. Text tiling based detector 235 also examines text characteristics such as change in text font, size, alignment, and emoticons used in the dialog, to determine if a topic change has occurred. Text tiling based detector 235 provides a score relative to the probability of a topic change within a communication span based on the examination of text groupings and text characteristics.

Change detector aggregator 240 receives the scoring input from all the detectors and aggregates the scores. Change detector aggregator 240 is trained and determines if certain detector scores receive higher weight than other detectors in determining an overall score. Change detector aggregator 240 generates an overall aggregate score. It should be pointed out that depending on the participant and other variables of the communication span, change detector aggregator 240 may not necessarily receive scores from all detectors, or for any detector, for a given communication span.

Determine change 245 receives the overall aggregate score from change detector aggregator 240 and compares the aggregate score to a threshold score determined in the training of the topic change model of topic change program 300. If the aggregate score crosses the threshold score, a topic change is determined by topic change program 300.

Personalized history 250 stores the information associated with the participant's historic communications, such as frequency of topic change, number of dialog exchanges before a topic changes, and information of other participants of communications. Personalized history 250 is updated by the feedback process. Keyword list 260 is a grouping of keywords and phrases that are associated with changing a topic or introducing a topic change. In one embodiment of the present invention, the keywords and phrases of keyword list 260 may be stored in a file, a table, or a database, or other non-volatile storage structure. In one embodiment of the present invention, previous topic 270 includes the topics discussed in historic communications, and may be used along with personalized history 250 to provide information regarding a participant's communication behavior. In another embodiment, the information stored in previous topic 270 is included in personalized history 250.

Figure 3:
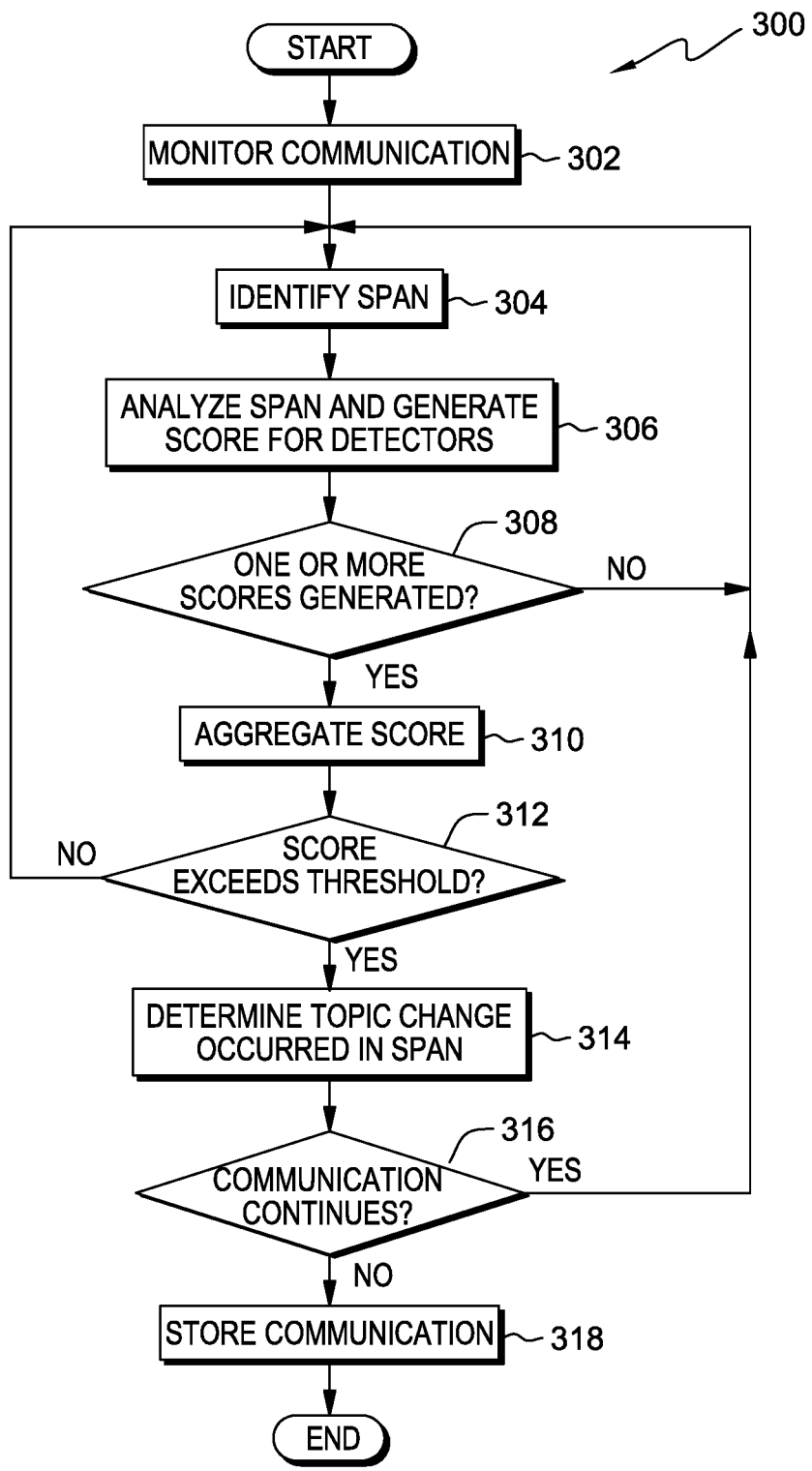
FIG. 3 illustrates operational steps of a topic change program, inserted on a computing device within the communication processing environment of FIG. 1, in accordance with an embodiment of the present invention.

FIG. 3 illustrates operational steps of a topic change detector program, inserted on a computing device within the communication processing environment of FIG. 1, in accordance with an embodiment of the present invention. Topic change program 300 includes a trained learning model that uses multiple detectors to generate scores based on detected content of communication dialog spans. Topic change program 300 monitors a communication (step 302). In one embodiment of the present invention, topic change program 300 resides on communication hosting computer 140 and monitors the communication dialog exchanges of participants accessing communication hosting computer 140. In another embodiment, topic change program 300 may reside on a client device of a participant and monitors the dialog of the participants of a communication. The communication may be text entered by participants, or may be voice communication transformed to text by another application, such as a speech recognition program, and is then input to topic change program 300.

As a communication proceeds, topic change program 300 identifies a span of the communication (step 304). A span is a grouping of one or more consecutive dialog statements of a communication between participants, and may include a single statement or include dozens of statements, but in general includes a few dialog exchanges between participants. For example, a span may include two to five dialog exchanges between participants of a communication. Identifying a span defines the statements to be analyzed by the various topic change detectors of topic change program 300.

Topic change program 300 analyzes the span and generates a score for each detector (step 306). Topic change program 300 analyzes the communication span using the various type of detectors to determine a topic change. Each detector focuses on a specific part of the communication span and makes comparisons from the current communication span content to known or probable indicators of topic changes. Topic change program 300 generates a score for each of the detectors that determines an indicator of a topic change, based on the span content considered.

For example, the content of a communication span includes six dialog statement exchanges between participants. The keyword based detectors compares the text words and sequential combinations of words as phrases, to a lookup table of words and phrases that are known to indicate a topic change with a high probability. The time based detector compares the pause time between dialog statement exchanges to determine if the pauses are significantly longer and may also compare duration of the span and duration of the communication if multiple spans have been analyzed. If the comparisons indicate a time based behavior associated with a topic change, topic change program 300 generates a score. Similarly, topic change program 300 analyzes the content of the communication span for other detectors, generating scores if content is determined to indicate a probable topic change.

Topic change program 300 determines if one or more scores are generated (decision step 308), and determining that no scores were generated (step 308, "NO" branch), topic change program 300 proceeds to step 304, to identify the next span of communication. Determining that no scores were generated indicates that the detectors analyzing the content associated with the current communication span did not include indicators of a topic change that would result in generation of a score.

Determining that one or more scores have been generated (step 308, "YES" branch), topic change program 300 aggregates the scores generated by the detectors (step 310). Each of the detectors of topic change program 300 that determines an indication of a topic change from the communication span content, has a score generated, which is associated with the detector. Topic change program 300 aggregates the scores into an overall score. In one embodiment of the present invention, detectors may receive different weight during the aggregation of detector scores, based on the results of training of the model used by topic change program 300. For example, the score generated by the keyword based detector may be weighted by a factor of three, as it is included in the aggregate score, whereas the score generated by the time based detector may be added to the aggregate score with no additional weight.

Having determined an aggregate score for the communication span, topic change program 300 determines if the aggregate score exceeds a threshold condition which has been pre-determined during model training (decision step 312). For example, if the threshold condition is 100 and scores greater than the threshold condition indicate a high probability of a topic change, an aggregate score of 115 results in triggering the threshold condition, in which topic change program 300 determining that a topic change has occurred.

Determining that the aggregate score does not exceed the threshold value (step 312 "NO" branch), topic change program 300 returns to step 304 and identifies the next communication span. Determining that the aggregate score does exceed the threshold value (step 312, "YES" branch), topic change program determines that a topic change has occurred.

One of ordinary skill in the art will recognize that the choice of exceeding a threshold is dependent upon the generation of scores and the aggregation of scores, such that a higher score indicates a higher probability of a topic change. Embodiments of the present invention may be implemented such that lower generated scores indicate a higher probability of a topic change, as a matter of preference, in which case one may describe the score as violating the threshold, as an indication of a higher probability of a topic change.

Determining that the aggregate score does exceed the threshold (step 312, "YES" branch), topic change program 300 determines that a topic change occurred (step 314). Topic change program 300 determines that a topic change occurred based on the aggregate score exceeding the threshold value. The threshold value is determined during training of the model of topic change program 300, using labelled data, and the model continues training based on feature updates from the feedback analysis, subsequently performed on a communication span as a result of a detected topic change. The aggregate score may include the score of only one detector, or may be a combination of scores from multiple detectors and weighted values assigned to scores of detectors. The determination of a topic change may be used as input to another application that provides activity or information to participants of the communication.

Having determined that a topic change occurred, topic change program 300 checks whether the communication has ended or if the communication continues (decision step 316). By continually monitoring the communication, topic change program 300 determines when a communication ends by the absence of new dialog statements, extended duration of time with no participant activity, or loss of connection, for example. Based on determining that the communication continues (step 316, "YES" branch), topic change program 300 proceeds to step 304 to identify the next communication span. Having determined that the communication has ended, topic change program 300 stores the communication content data (step 318).

The completed communication is stored in a storage device, accessible by feedback program 400, to conduct further analysis of the communication content to improve the accuracy of topic change program 300. For example, the communication content may be stored in topic change DB 130 (FIG. 1), and is accessible to feedback program 400 via network 150. Alternatively, the communication content may be stored on a hard drive of communication hosting computer 140. The stored communication content includes the text of dialog statements, expressions and formats of the text dialog statements, the timing data associated with the dialog statements, the participant activity data associated with the spans of the communication, the spans analyzed by detectors, and the spans associated with topic changes. The stored communication content is used by feedback program 400 to improve the model used by topic change program 300. Having stored the communication content, topic change program 300 ends.

Figure 4:
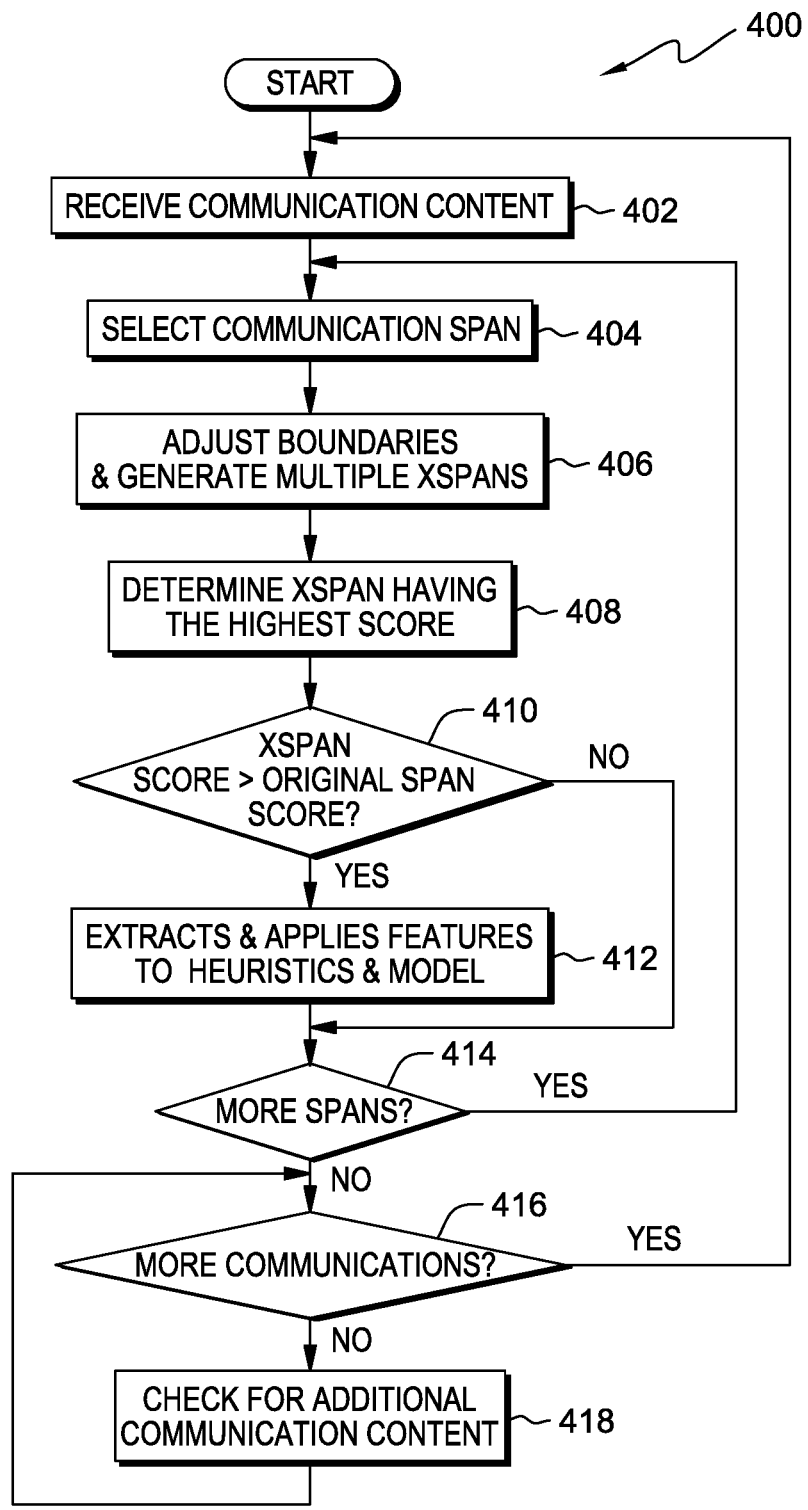
FIG. 4 illustrates the operational steps of a feedback program, inserted on a computing device within the communication processing environment of FIG. 1, in accordance with an embodiment of the present invention.

FIG. 4 illustrates the operational steps of feedback program 400, inserted on a computing device within the communication processing environment of FIG. 1, in accordance with an embodiment of the present invention. In one embodiment of the present invention, feedback program 400 operates in a background mode, and receives stored communication content (step 402). Communications up to and including the detection of a topic change are stored, for example, in topic change DB 130, and are accessible by feedback program 400. The communication content that is received includes identification of at least one communication span, which includes a topic change. Timing information related to pauses in the dialog, duration of the topic, and duration of the communication, are associated with the corresponding span, as is information associated with external activity on the participant's client device. In another embodiment of the present invention, feedback program 400 receives communication content by accessing the content in a designated storage location, such as topic change database 130 (FIG. 1).

Feedback program 400 selects a communication span (step 404). In one embodiment of the present invention, stored communication content may include multiple spans, each including a detected topic change. Feedback program 400 selects a first communication span from the communication content. For example, feedback program 400 receives communication content having ten spans that include topic changes. Each of the ten spans may be identified to distinguish the different spans, such as spans 1 through 10, in this example. Feedback program 400 selects span 1 and proceeds. Feedback program 400 iteratively selects the communication spans of the communication content received, and in general selects the spans in the order in which they chronologically occur, however in other embodiments, a different order of selection may be used.

Feedback program 400 adjusts the boundaries of a span and generates multiple extra spans (step 406). A first span containing one or more dialog statements has been identified as including a topic change, hereafter referred to as the "original span". By adjusting the boundaries of the dialog statements of the original span, feedback program 400 generates a "new span" that differs from the original span by the addition of one or more dialog statements of the communication. Multiple new spans, also referred to as "extra spans", are generated by adding one or more dialog statements at one end of the communication span, and removing one or more dialog statements at the other end. For example a span may include a total of six dialog statements in which a topic change was determined. Feedback program 400 adds the next "n" statements of the communication, and removes the first "n" statements of the span to generate an extra span. In another embodiment of the present invention the number of added and removed dialog statements to generate an extra span, is not required to be the same. For example, two statements may be added and one statement removed, generating a new span, or one statement may be added and two removed.

Having generated multiple extra spans, feedback program 400 determines the extra span having the highest score (step 408). The original span and the extra spans are scored based on the topic of the span, using heuristic methods, and the highest scoring extra span is determined. Feedback program 400 scores the extra spans and the original span based on the topic of the span and not by detecting a topic change. Feedback program 400 determines the extra span having the highest score based on the probability of the determined topic of the extra span being the actual or primary topic.

Feedback program 400 determines if the extra span having the highest score is greater than the score of the original span of communication (decision step 410). Based on determining that the extra span having the highest score is not greater than the score of the original span (step 410, "NO" branch), feedback program 400 checks if there are more communication spans (decision step 414). Determining that the extra span with the highest score is greater than the score of the original span (step 410, "YES" branch), feedback program 400 extracts and applies features from the extra span to the heuristics and model (step 412).

The extra span includes dialog statements, referred to as delta statements, which are not present in the original communication span. The delta statements contribute to the extra span having a higher score than the original span, or in other embodiments, the extra span having a score more favorable than the original span. The features of the delta statements are extracted and then classified with respect to one or more of the detectors of the model used by topic change program 300. The classified features are mapped to a corresponding detector and are used to update the corresponding detector to better determine a topic change within a communication. In this manner, the model is continually improved, and can adapt to detecting changes in slang, expression, vocabulary and behavior, that lead to topic changes. The extra span may also include additional associated data, such as the time-based data, participant activity on the communication device, and personalized history of the participant. The additional data is also classified, mapped to one or more detectors, and used to update the corresponding detectors to improve the topic change detection of topic change program 300.

Having extracted, classified and mapped features to detectors of the topic change model, feedback program 400 determines if there are more spans (decision step 414). Based on determining that more spans are available for feedback analysis, (step 414, YES" branch), feedback program 400 proceeds to step 404 and selects another communication span, and proceeds as described above. Determining that no additional spans of communication content are available (step 414, "NO" branch), feedback program 400 checks to determine if there is more communication content (decision step 416).

Feedback program 400 checks if more communication content is available, and determining that more communication content is available (step 416, "YES" branch), feedback program 400 proceeds to step 402 and receives the communication content, and proceeds as described above. In one embodiment of the present invention, feedback program 400 may determine if more communication content is available by checking a designated storage location, for example, topic change DB 130. In another embodiment, feedback program 400 may receive a message from topic change program 300 indicating that additional communication content is available. In yet other embodiments, feedback program 400 may receive the additional communication content from topic change program 300 and perform operations on the communication content, or may store the additional communication content to perform operations on the content at a later time.

Determining that there are no additional communications to process (step 416, "NO" branch), feedback program 400 continues to check for additional communication content (step 418). Feedback program 400 operates as an application running in the background, and continues to monitor or check if content from an additional communication is available. In one embodiment of the present invention, the frequency and timing of feedback program 400 accessing the storage location of communication content to check for communication content that has not been submitted to the feedback analysis performed by feedback program 400, may be set as a preference, based on known frequencies and durations of communications, or other performance factors. In another embodiment of the present invention, after storing a communication, topic change program sends a message to feedback program 400 indicating that a communication is available for feedback processing.

Figure 5:
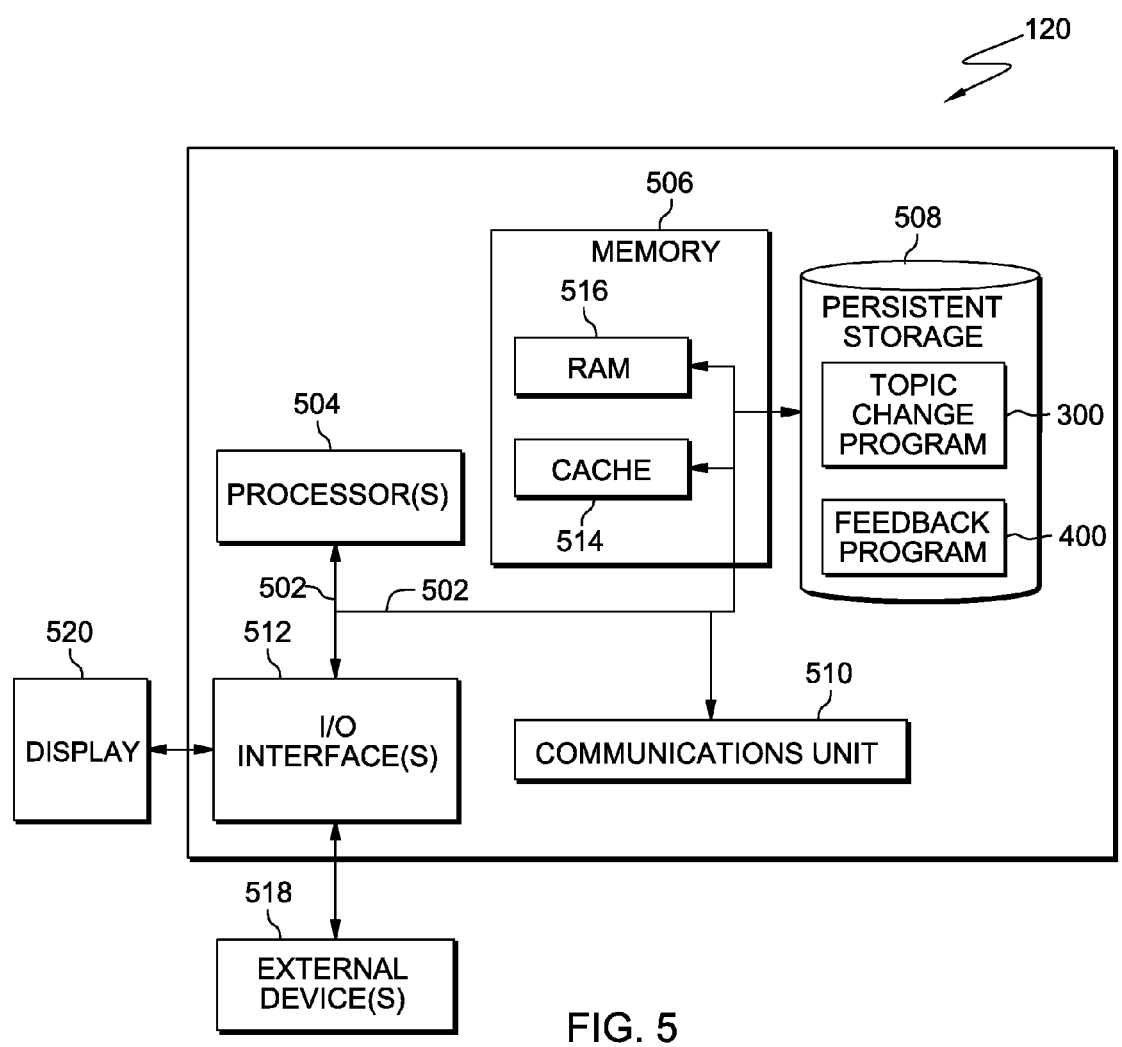
FIG. 5 depicts a block diagram of components of a computing device capable of executing the topic change program and feedback program, in accordance with an embodiment of the present invention.

FIG. 5 depicts a block diagram of components of computing device 120 capable of executing topic change program 300 and feedback program 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 120 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Topic change program 300 and feedback program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications of computing device 120 with other data processing systems or devices, including resources of distributed communication processing environment 100. In these examples, communications unit 510 includes one or more network interface cards. Communications unit 510 may provide communications through the use of either or both physical and wireless communications links. Topic change program 300 and feedback program 400 may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Topic change program 300 and feedback program 400 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for determining a topic change of a communication, the computer system comprising:
   one or more computer processors;
   one or more computer readable storage media; and
   program instructions stored on the computer readable storage media for execution by at least one of the one or more processors, the program instructions comprising:
   program instructions to monitor a communication including a first span;
   program instructions to determine the communication containing a set of dialog statements, wherein the first span of the communication includes one or more dialog statements of the set of dialog statements;
   program instructions to determine if the one or more dialog statements of the first span include one or more indicators of a topic change, wherein the one or more indicators are identified by at least one detector of a learning model,
      wherein each of the one or more indicators of the topic change within the first span includes at least one of: a particular key phrase, a pause of particular duration, a particular activity on a participant's communication device, and a particular duration of the first span;
   responsive to determining the first span includes the one or more indicators of the topic change, program instructions to generate a score for the one or more indicators, based on the learning model;
   responsive to the score for the one or more indicators triggering a threshold condition, program instructions to determine a topic change within the first span,
      wherein the threshold condition is based on a determination of the topic change within the first span of the communication during training of the learning model, and
      wherein the threshold condition determined during training of the learning model includes:

program instructions to determine a weighted value for the at least one detector, based on heuristics, program instructions to receive input of labelled communication dialog statements, wherein the labelled communication dialog statements include one or more topic change indicators that are known, the one or more topic change indicators corresponding to the at least one detector, program instructions to adjust the weighted value of the at least one detector in response to a delta between an output of scores of the at least one detector of the learning model and scores of the one or more topic change indicators that are known, and program instructions to determine the threshold condition in response to achieving an acceptable minimum for the delta between the output of the scores which are determined by the at least one detector of the learning model and the scores of the one or more topic change indicators that are known;

program instructions to generate a second span based on adjusting boundaries of the first span by performing at least one of, adding to the first span one or more dialog statements of the set of dialog statements not included in the first span, and removing one or more dialog statements from the first span;

program instructions to determine a score for the first span and a score for the second span, wherein the score for the first span and the score for the second span is based on a topic of the first span and a topic of the second span, respectively;

responsive to the score of the second span being more favorable than the score of the first span, program instructions to extract one or more features from the one or more dialog statements of the second span not included in the first span, wherein extracting the one or more features from the one or more dialog statements of the second span, includes classifying the one or more features to correspond with the at least one detector of the learning model; and program instructions to train the learning model to determine a topic change, based, at least in part, on including the one or more features from the one or more dialog statements of the second span, in at least one detector of the learning model.

* * * * *